US010882378B2

(12) United States Patent
Jiang et al.

(10) Patent No.: US 10,882,378 B2
(45) Date of Patent: Jan. 5, 2021

(54) ATV AIR HEAT EXCHANGER WITH MOUNTING STRUCTURE AND LINKAGE

(71) Applicant: Zhejiang CFMOTO Power Co., Ltd., Zhejiang (CN)

(72) Inventors: Xiaolu Jiang, Hangzhou (CN); Jutao Yang, Hangzhou (CN)

(73) Assignee: Zhejiang CFMoto Power Co., Ltd., Zhejiang (CN)

(*) Notice: Subject to any disclaimer, the term of this patent is extended or adjusted under 35 U.S.C. 154(b) by 67 days.

(21) Appl. No.: 16/104,065

(22) Filed: Aug. 16, 2018

(65) Prior Publication Data
US 2019/0054797 A1    Feb. 21, 2019

(30) Foreign Application Priority Data

Aug. 18, 2017    (CN) .................... 2017 2 1037799 U
Aug. 18, 2017    (CN) .................... 2017 2 1038623 U
Aug. 18, 2017    (CN) .................... 2017 2 1038656 U

(51) Int. Cl.
*B60H 1/00*    (2006.01)
*B60H 1/24*    (2006.01)
*B60H 1/12*    (2006.01)

(52) U.S. Cl.
CPC ..... *B60H 1/00521* (2013.01); *B60H 1/00407* (2013.01); *B60H 1/242* (2013.01); *B60H 1/00678* (2013.01); *B60H 1/12* (2013.01); *B60H 2001/00214* (2013.01)

(58) Field of Classification Search
CPC ............ B60H 1/00521; B60H 1/00407; B60H 1/242; B60H 2001/00214; B60H 1/12; B60H 1/00678

USPC ........................................................ 180/68.6
See application file for complete search history.

(56) References Cited

U.S. PATENT DOCUMENTS

| | | | | |
|---|---|---|---|---|
| 2,828,095 A | * | 3/1958 | Beck ...................... | F16F 1/3732 248/612 |
| 2,984,415 A | * | 5/1961 | Wilfert ................... | B60H 1/247 237/12.3 A |
| 3,377,024 A | * | 4/1968 | Nutten .................... | F23D 11/40 239/8 |
| 3,387,549 A | * | 6/1968 | De Coye de Castelet ................. B60H 1/00864 454/159 |
| 3,683,783 A | * | 8/1972 | Pedrani .............. | B60H 1/00042 454/152 |
| 3,744,558 A | * | 7/1973 | Childress .................. | F16K 3/26 165/71 |
| 3,929,201 A | * | 12/1975 | Hoffman ................ | B60K 11/04 180/68.4 |

(Continued)

*Primary Examiner* — Ljiljana V. Ciric
(74) *Attorney, Agent, or Firm* — Jeffrey D. Shewchuk; Shewchuk IP Services, LLC

(57) ABSTRACT

An off road vehicle has an air heater with right and left shells surrounding and supporting a core, with the right and left shells connected by screws extending through ears on one of the shells into bosses on the other shell. Dual air control plates are mounted in the shell on a shaft for pivoting movement. An actuator is linked to the shaft by a swing arm with a guide pin riding in an arced slot of a drive plate rotationally secured to the shaft. The right and left shells are secured to the vehicle using a resilient compressible grommet, with a bushing extending through the grommet and a bolt extending through the bushing and attached into the frame.

12 Claims, 9 Drawing Sheets

(56) References Cited

U.S. PATENT DOCUMENTS

| | | | | |
|---|---|---|---|---|
| 3,938,586 A * | 2/1976 | Barlow | | F01P 11/12 165/51 |
| 4,139,053 A * | 2/1979 | Schaal | | F01P 11/0276 165/71 |
| 4,140,177 A * | 2/1979 | Ivie, Sr. | | B60K 11/04 165/134.1 |
| 4,330,030 A * | 5/1982 | Cate | | F28D 7/08 165/149 |
| 4,383,642 A * | 5/1983 | Sumikawa | | B60H 1/00064 165/42 |
| 4,436,145 A * | 3/1984 | Manfredo | | F02B 29/0456 123/563 |
| 4,441,547 A * | 4/1984 | Argyle | | F28F 9/002 165/67 |
| 4,519,467 A * | 5/1985 | Saunders | | B60K 11/04 165/41 |
| 4,592,437 A * | 6/1986 | Holm | | F01P 11/12 160/105 |
| 4,616,693 A * | 10/1986 | Dietzsch | | B60H 1/00521 165/41 |
| 4,750,780 A * | 6/1988 | Harasaki | | B62D 25/081 296/192 |
| 4,770,234 A * | 9/1988 | Hiraoka | | B60K 11/04 165/69 |
| 4,789,121 A * | 12/1988 | Gidseg | | F16M 7/00 248/188.2 |
| 4,828,017 A * | 5/1989 | Watanabe | | B60K 11/04 165/41 |
| 4,858,866 A * | 8/1989 | Werner | | B60K 11/04 248/213.3 |
| 5,219,019 A * | 6/1993 | Le Gauyer | | B60K 11/04 165/140 |
| 5,263,535 A * | 11/1993 | Philo | | F28F 9/013 165/67 |
| 5,269,367 A * | 12/1993 | Susa | | B60R 11/00 165/140 |
| 5,277,554 A * | 1/1994 | Elson | | F04B 39/00 248/638 |
| 5,544,714 A * | 8/1996 | May | | B60K 11/04 165/67 |
| 5,566,748 A * | 10/1996 | Christensen | | F02B 29/0475 165/67 |
| 5,676,197 A * | 10/1997 | Diebold | | F01P 11/12 165/119 |
| 5,687,790 A | 11/1997 | Trame et al. | | |
| 5,758,860 A * | 6/1998 | Hanazaki | | B60K 11/04 180/68.4 |
| 5,872,890 A | 2/1999 | LaCombe | | |
| 6,106,228 A * | 8/2000 | Bartlett | | F01P 11/10 123/41.11 |
| 6,186,885 B1 | 2/2001 | Ahn et al. | | |
| 6,234,569 B1 * | 5/2001 | Derleth | | B60H 1/0055 296/208 |
| 6,247,319 B1 * | 6/2001 | Kawahara | | B60H 1/00507 403/12 |
| 6,298,908 B1 * | 10/2001 | Harrell | | B60H 1/00521 165/69 |
| 6,390,180 B1 * | 5/2002 | Olsen | | F28F 9/002 165/125 |
| 6,412,581 B2 * | 7/2002 | Enomoto | | B60K 11/04 165/69 |
| 6,447,041 B1 * | 9/2002 | Vandersluis | | B60H 1/0055 296/203.02 |
| 6,550,558 B2 * | 4/2003 | Yorwarth | | B60K 11/04 16/2.1 |
| 6,582,011 B2 * | 6/2003 | Palazzolo | | B60H 1/0055 296/208 |
| 6,601,639 B2 * | 8/2003 | Shibata | | B60H 1/00521 165/42 |
| 6,676,202 B2 * | 1/2004 | Brancheriau | | B62D 25/142 296/208 |
| 6,688,680 B1 * | 2/2004 | Cooper | | B62D 25/145 296/208 |
| 6,772,833 B2 * | 8/2004 | Auer | | B60H 1/00064 165/202 |
| 6,872,134 B2 * | 3/2005 | Mills | | B60H 1/00028 454/121 |
| 6,920,921 B2 | 7/2005 | Nagata et al. | | |
| 6,929,312 B2 * | 8/2005 | Rich | | B60H 1/0055 296/187.02 |
| 6,957,711 B2 * | 10/2005 | Jung | | B60K 11/04 165/67 |
| 7,114,587 B2 * | 10/2006 | Mori | | B60K 11/04 180/68.3 |
| 7,150,335 B2 * | 12/2006 | Sasano | | B62D 25/084 180/68.4 |
| 7,263,851 B2 * | 9/2007 | Yun | | F25D 23/006 181/207 |
| 7,510,165 B2 * | 3/2009 | Heshmati | | B60H 1/00671 251/64 |
| 7,575,082 B2 * | 8/2009 | Wilbert | | F16B 5/0241 165/67 |
| 7,882,913 B2 * | 2/2011 | Maeda | | B60K 11/04 180/68.4 |
| 7,886,814 B2 * | 2/2011 | Yamamoto | | B60H 1/00028 165/202 |
| 7,905,278 B2 * | 3/2011 | Sato | | B60H 1/00035 165/202 |
| 8,312,949 B2 * | 11/2012 | Hirukawa | | B60K 11/08 180/68.1 |
| 8,408,980 B2 * | 4/2013 | Nanaumi | | B60H 1/242 454/121 |
| 8,528,677 B2 * | 9/2013 | Davis | | F01P 11/12 123/41.19 |
| 8,590,650 B2 * | 11/2013 | Schertz | | F28F 27/00 123/41.49 |
| 8,672,067 B2 * | 3/2014 | Ajisaka | | B60H 1/00535 165/41 |
| 8,936,121 B2 * | 1/2015 | Vacca | | B60K 11/04 165/44 |
| 9,249,984 B2 * | 2/2016 | Mathuria | | F24F 13/222 |
| 9,272,601 B2 * | 3/2016 | Hara | | B60H 1/00528 |
| 9,731,591 B2 * | 8/2017 | Kuhn | | B60K 11/04 |
| 10,048,023 B2 * | 8/2018 | Wang | | B60K 11/04 |
| 10,272,740 B2 * | 4/2019 | Mazzocco | | B60H 1/00678 |
| 10,337,394 B2 * | 7/2019 | Kondou | | F01P 5/06 |
| 10,385,757 B2 * | 8/2019 | Ohlhoff | | F28D 1/0435 |
| 2001/0024047 A1 * | 9/2001 | Neuss | | B62D 25/142 296/70 |
| 2001/0043835 A1 * | 11/2001 | Mainka | | B62D 25/145 403/270 |
| 2002/0000307 A1 * | 1/2002 | Denk | | B60H 1/00678 165/42 |
| 2002/0029852 A1 * | 3/2002 | Egashira | | H01L 21/67313 156/345.12 |
| 2002/0038965 A1 * | 4/2002 | Palazzolo | | B62D 25/145 296/208 |
| 2002/0153750 A1 * | 10/2002 | Feith | | B62D 25/145 296/208 |
| 2003/0006033 A1 * | 1/2003 | Kawada | | B60H 1/00521 165/202 |
| 2003/0193207 A1 * | 10/2003 | Ito | | B62D 25/145 296/72 |
| 2004/0169401 A1 * | 9/2004 | Laborie | | B60H 1/242 296/208 |
| 2004/0188156 A1 * | 9/2004 | Karube | | B62J 17/02 180/68.4 |
| 2005/0265857 A1 * | 12/2005 | Lee | | F04B 39/0044 417/363 |
| 2005/0279548 A1 * | 12/2005 | Kurtz, Jr. | | B60K 11/04 180/68.6 |
| 2007/0214818 A1 * | 9/2007 | Nakamura | | B62D 33/0617 62/239 |
| 2008/0017138 A1 * | 1/2008 | Rogg | | B60K 11/085 123/41.05 |
| 2008/0314072 A1 * | 12/2008 | Plank | | B60H 1/00364 62/498 |

(56) References Cited

U.S. PATENT DOCUMENTS

| | | | |
|---|---|---|---|
| 2010/0218530 A1* | 9/2010 | Melbostad | B60H 1/00521 |
| | | | 62/244 |
| 2012/0199661 A1* | 8/2012 | Hara | B60H 1/00528 |
| | | | 236/92 B |
| 2012/0251350 A1* | 10/2012 | Suitou | F04B 39/121 |
| | | | 417/363 |
| 2012/0255709 A1* | 10/2012 | Kinder | F28F 9/0075 |
| | | | 165/67 |
| 2013/0320102 A1* | 12/2013 | Litwing | B60H 1/22 |
| | | | 237/28 |
| 2015/0027799 A1* | 1/2015 | Omi | B60H 1/00592 |
| | | | 180/274 |
| 2016/0176443 A1* | 6/2016 | Nakamura | H04W 4/90 |
| | | | 296/24.4 |
| 2016/0311290 A1* | 10/2016 | Gonzalez Rechea | F25B 9/008 |
| 2017/0036518 A1* | 2/2017 | Kitagishi | B60H 3/0658 |
| 2017/0247061 A1* | 8/2017 | An | B60H 1/00207 |
| 2018/0134115 A1* | 5/2018 | Shimada | B60H 1/32 |
| 2018/0141405 A1* | 5/2018 | Iyer | B60H 1/00528 |
| 2018/0162461 A1* | 6/2018 | Setoguchi | B60H 1/242 |
| 2018/0306465 A1* | 10/2018 | Amato | A61F 7/0085 |
| 2019/0056044 A1* | 2/2019 | Hashizume | B60H 1/00264 |
| 2019/0224721 A1* | 7/2019 | Persson | F16B 23/0061 |
| 2019/0263453 A1* | 8/2019 | Yamazaki | B62D 21/15 |
| 2019/0315088 A1* | 10/2019 | Bomphray | B32B 27/36 |

\* cited by examiner

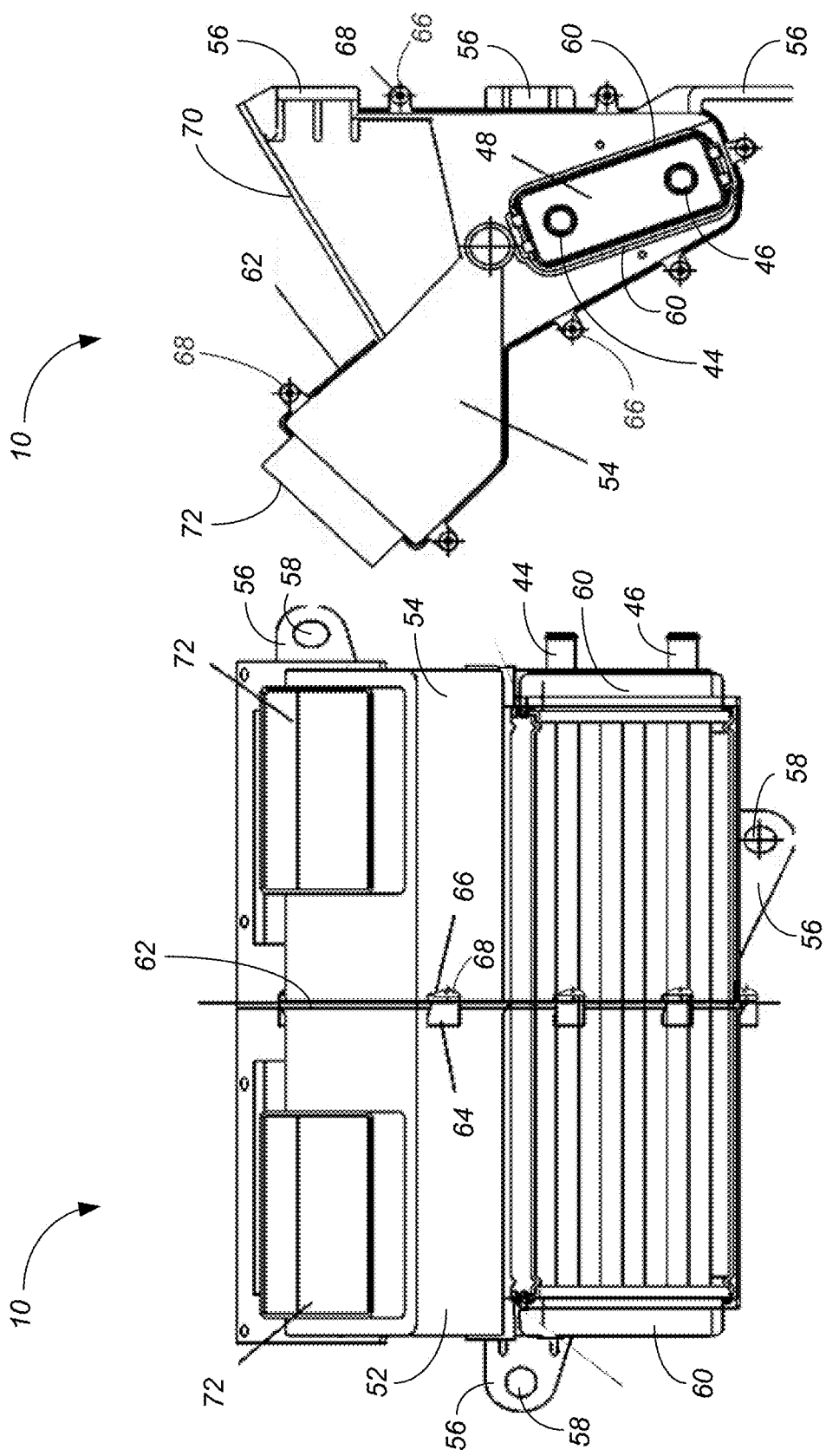

ATV AIR HEAT EXCHANGER WITH MOUNTING STRUCTURE AND LINKAGE

CROSS-REFERENCE TO RELATED U.S. APPLICATION(S)

None.

FIELD OF THE INVENTION

The present invention relates to air heaters or air conditions used in vehicles, particularly in offroad vehicles such as UVs and ATVs.

BACKGROUND OF THE INVENTION

Utility vehicles ("UVs") and all terrain vehicles ("ATVs") are well known for travel over a wide variety of terrains, including over unpaved trails or fields, rocks, etc. Such vehicles are widely used in agriculture and forestry operations, as well as in safety operations such as for rugged mountain crossings. Such vehicles are also widely used for recreational enjoyment in natural, outdoor settings away from pavement.

While the cab of UVs and ATVs is commonly much less contained and air-tight than the cab of on road vehicles, some UVs and ATVs still have a system to change the air temperature in the cab of the vehicle to increase occupant comfort, and particularly an air heater to increase occupant comfort during use of the UV or ATV on a cold day. The air heater or air conditioner includes a heat exchanging device known as a core. In the air heater system, the core typically receives liquid coolant which has been heated within the internal combustion engine, and the heater system blows forced air across or through the core to exchange heat from the coolant to the air blown into the vehicle cab. In the air conditioner system, the core is typically a condenser of a refrigerant system that has a separate compressor driven by the vehicle engine, with forced air blown across or through the core.

Regardless of whether the air heat exchanger in the off road vehicle is a heater, an air conditioner or both, the core needs to be supported relative to the forced air flow, usually by a housing structure. UVs and ATVs often travel over rougher surfaces than on-road vehicles, and the core mounting structure must adequately support the core and stably withstand vibration. The housing shell structure may be formed of separate shell halves, providing limiting plates on both sides of the core. The separate shell halves may be connected together around the core by glue adhesion, making for a complex assembly process. Due to the adhered connection, should it be necessary to replace internal parts of the air heater, the shell needs to be broken and then removed, in which case it is easy to cause damage to internal components and he disassembling process is complex.

The forced air flow across the core is typically controlled by an air plate, with a powerful actuator driving the air plate to be rotationally swung within the air heater shell. With the powerful actuator, it is difficult to accurately adjust the swing angle position of the air plate.

Better core housing shell structures, suited for offroad vehicles such as UVs and ATVs, are needed.

BRIEF SUMMARY OF THE INVENTION

The present invention is a heat exchanger used in an offroad vehicle such as a UV or ATV, which includes a shell structure supporting a core. In one aspect the shell is formed by right and left halves joined around the core, in the preferred embodiment with bosses on one of the shells aligned with ears on the other shell and then fixed together with screws. The right and left shells include plates which support the core over planar surfaces. In another aspect, dual air control plates are mounted in the shell on a shaft for pivoting movement. An end of the shaft extends outside the shell, driven by an actuator through a linkage which moves more than the shaft movement to increase accuracy. In the preferred embodiment this linkage includes a swing arm with a guide pin riding in an arced slot of a drive plate rotationally secured to the shaft. In yet another aspect, the right and left shells are secured to the vehicle using a resilient compressible grommet, with a bushing extending through the grommet and a bolt extending through the bushing and attached into the frame.

BRIEF DESCRIPTION OF THE DRAWINGS

FIG. 3 is an elevational view showing core housing shell structure of a first embodiment of the present invention.

FIG. 4 is a side view of the core housing shell structure of FIG. 3.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
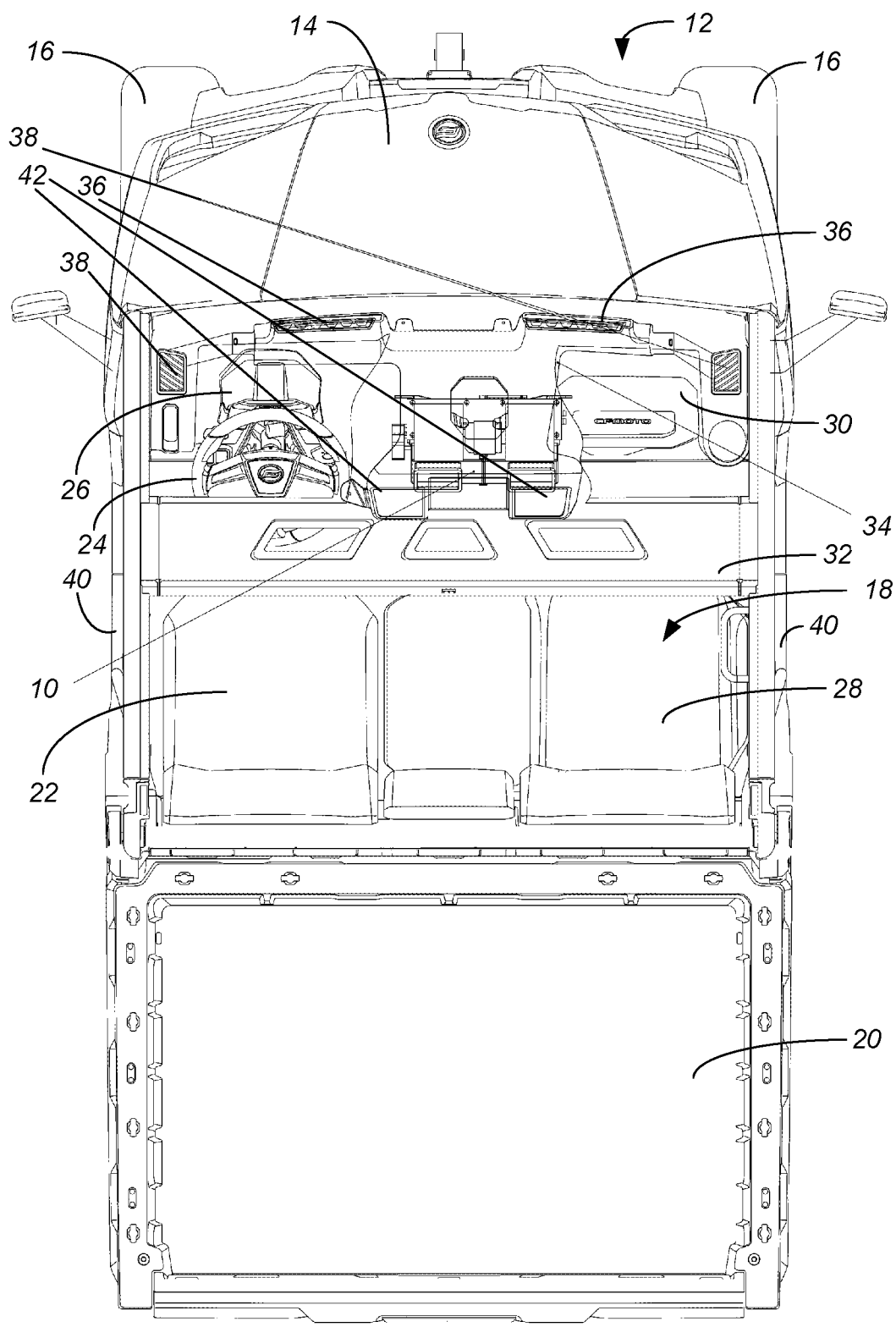
FIG. 1 is a top view of an ATV showing the heater in accordance with the present invention.

As shown in FIG. 1, the present invention involves an air heater 10 for use in a UV or ATV 12. The vehicle 12 is depicted with a front hood 14, two front wheels with tires 16 partially shown in front of the edges of the hood 14, a passenger compartment 18, and a rear cargo space 20 with rear wheels (not shown) thereunder. The passenger compartment 18 includes a driver's seat 22 behind a steering wheel 24 and instrument panel 26, and an opposing passenger's seat 28 behind a front dash board 30. A portion of a roof 32 obscures part of the passenger compartment 18. The air heater 10 is generally centrally mounted, behind the front dash 30, and directing air into the passenger compartment 18 through a forced air outlet manifold 34. The manifold 34 includes two air outlets 36 projecting air upward onto the windshield (not shown) such as for defrost or defogging purposes, two side air outlets 38 just in front of the side doors 40, and two air outlets 42 in front of the seats 22, 28. The air outlets 36, 38, 42 can be opened or closed such as with dampers as known in the art.

Figure 2:
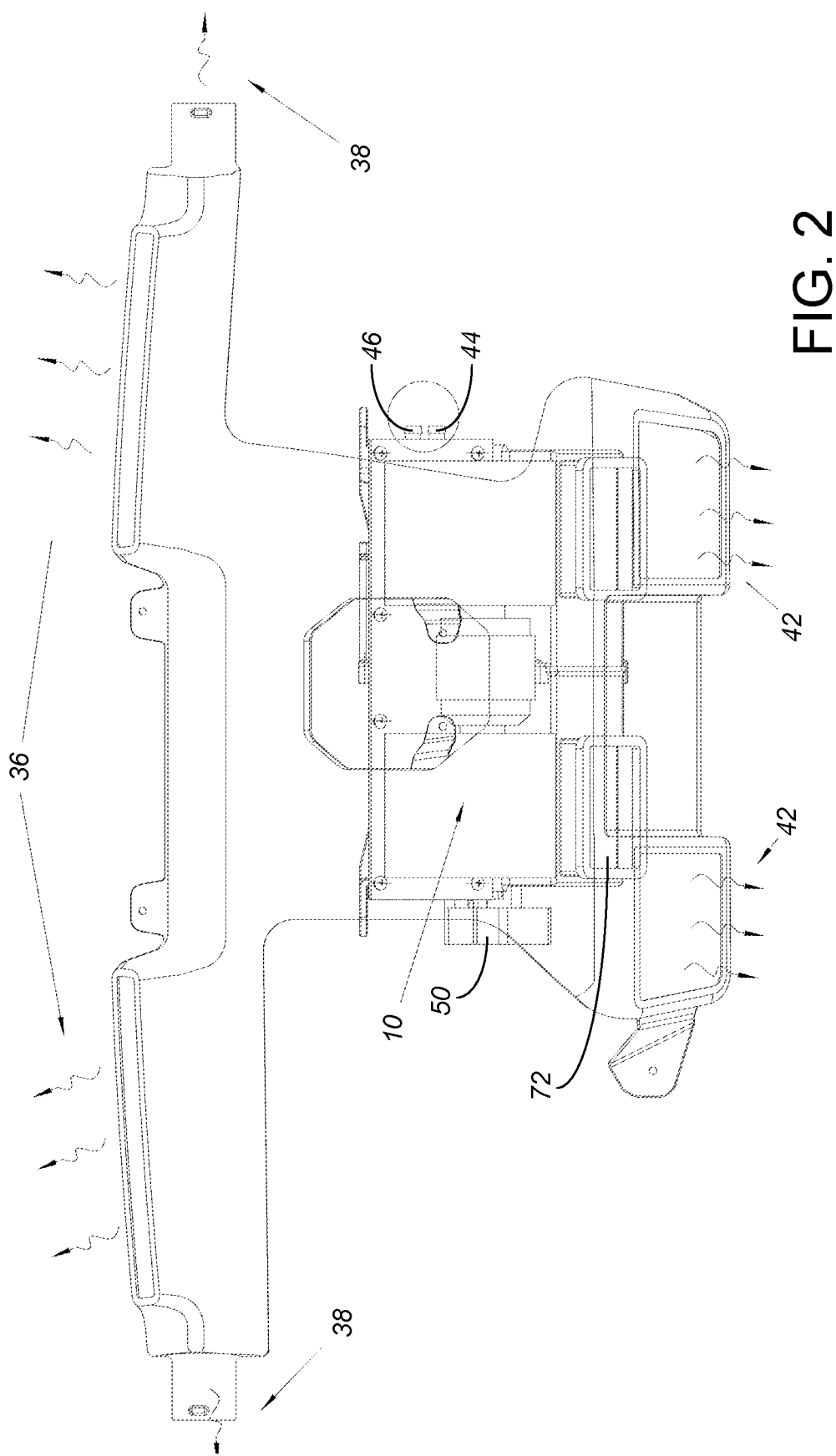
FIG. 2 is a top view of the heater and output air manifold of FIG. 1.

FIGS. 1 and 2 show the fluid inlet 44 and outlet 46 for the heater core 48, which in this embodiment are on the right (passenger) side of the air heater 10. In operation of the UV or ATV 12, coolant from the vehicle engine is piped (piping not shown) from the engine (not shown), circulated in the core 48, and then returned to the engine. FIGS. 1 and 2 also show the actuator 50 which controls the flow of forced air, powered by a fan (not shown) through the air heater 10 for heat transfer with the core 48.

As shown in FIGS. 3 and 4, the air heater 10 in accordance with one aspect of the present invention includes a left shell 52 and a right shell 54. Each shell 52, 54 includes structure for mounting relative to the frame of the UV or ATV 12, such as the mounting ears 56 with bolt through holes 58 (further described below with reference to FIGS. 8 and 9), and the terms "left" and "right" as used herein refer to the air heater 10 as mounted in the ATV and facing forward, i.e., facing with the driver's seat 22 on the "left" and the passenger's seat 28 on the right as shown in the Figures. While the shells 52, 54 could be formed of metal, more preferably they are molded out of a hard, lightweight plastic material.

Each shell 52, 54 includes a plate 60 protruding out of its inner wall to surround and support the core 48. The core 48 has a fluid inlet 44 and a fluid outlet 46, and during use coolant heated in the engine is circulated within the core 48 between the fluid inlet 44 and the fluid outlet 46. The plates 60 extend in the circumferential direction around the ends of the core 48, defining an installation hole for the core 48. The circumferentially extending plates 60 have a large contact area for the core 48, which minimizes the local force applied to the core 48 caused by the vibration of the vehicle 12, and reduces the likelihood that such vibration will cause damage to the core 48.

The connecting end of one of the shells 52 has a circumferential groove 62, with the other shell 54 mating into the circumferential groove 62. The connecting ends of the two shells 52, 54 also have bosses 64 which correspond in circumferential position to ears 66. In the preferred embodiment, there are seven such sets of bosses 64 and ears 66, circumferentially spaced to adequately connect the two shell halves 52, 54. Screws 68 are used to connect the corresponding bosses 64 and ears 66, pulling the two shells 52, 54 together and ensuring the mating connection between the shells 52, 54 using the groove 62. The screws 68 are preferably metal, and can be self-threading screws 68 threaded directly into the bosses 64.

The groove 62 and the fastening screws 68 allow the connection between the two shells 52, 54 to be substantially air tight without the use of an adhesive. If desired, a sealing strip or gasket (not shown) can be positioned within the groove 62 to increase the air tightness of the connection under the force provided by the screws 68.

The fastening screw connection allows the two shell halves 52, 54 to he assembled around the core 48, simpler than the installation of prior art heater cores into their shell.

At the same time, the screws 68 can be readily removed, allowing disassembly from the core 48 when desired.

Figure 5:
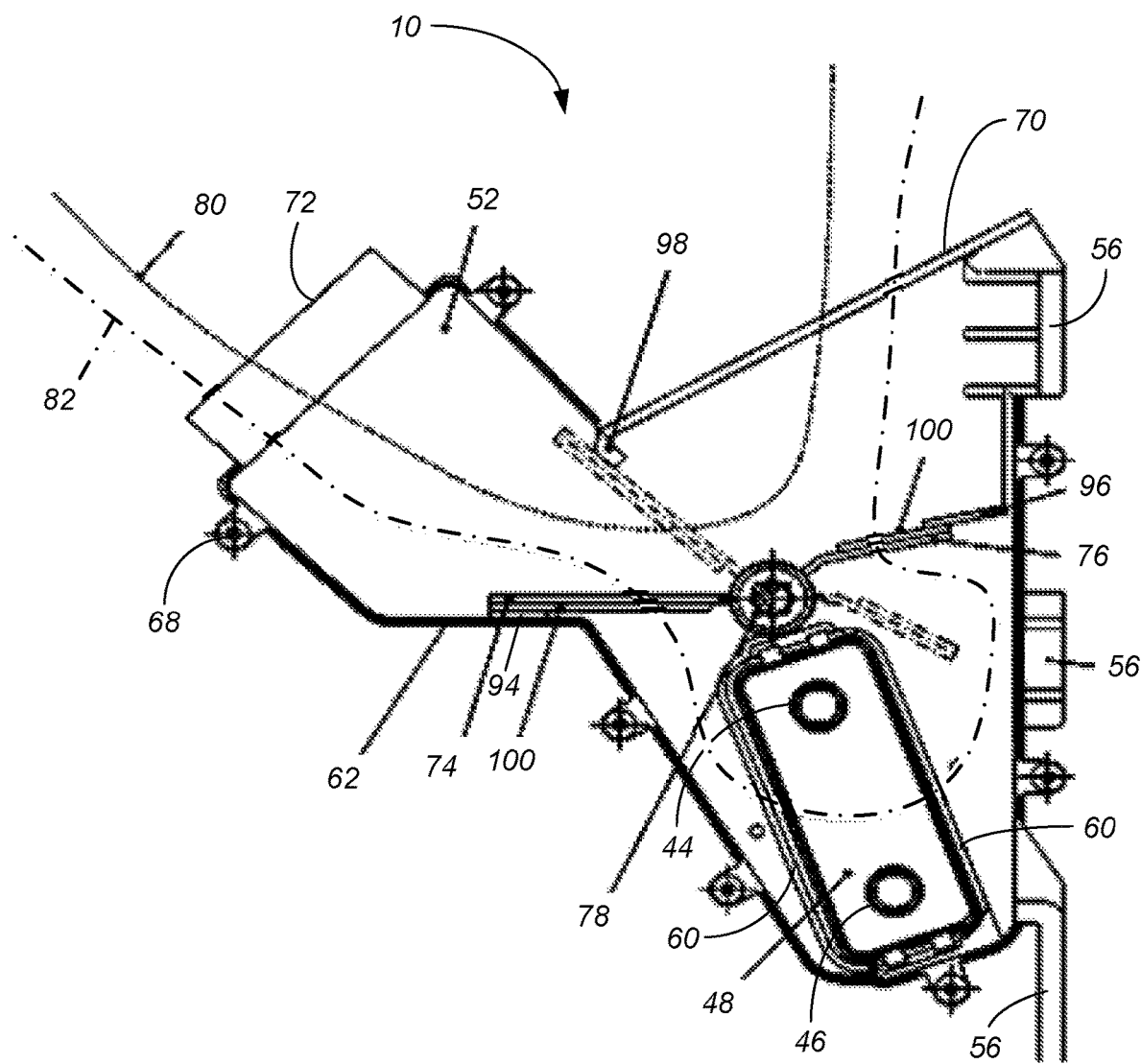
FIG. 5 is a simplified side view in partial cross-section, showing the forced air flow in the interior of the shell structure of FIGS. 1-4, based on positioning of the control plates.

As shown in FIG. 5, air is forced by a blower such as a fan (not shown) through an air inlet 70 to an air outlet 72 within the heater housing 52, 54. The heater 10 includes one or more movable air control plates, such as the dual air control plates 74, 76 of the preferred embodiment. These air control plates 74, 76 are preferably metal for strength, rigidity and long lasting performance, but alternatively could be formed of plastic sheet material. The dual air control plates 74, 76 extend radially from and pivot on a shaft 78. Rotation of the shaft 78 is controlled by the actuator 50. When the dual air control plates 74, 76 are in the solid line position shown in FIGS. 5 and 6, the general airflow 80 bypasses the core 48. When the actuator 50 rotates the shaft 78 and moves the dual air control plates 74, 76 to the dashed line position shown in FIGS. 5 and 6, the general airflow 82 proceeds through the core 48, heated by the coolant crossflow. In the preferred embodiment, the rotation from fully closed to fully opened is about a 42° rotation of the shaft 78.

The actuator 50 is mounted as convenient, but preferably on the outside of the shell 52, 54, with an end of the shaft 78 extendine out of the shell 52, 54 to be linked to the actuator 50. If desired, the actuator can be a mechanical linkage with a handle or other control inside the cab 18 of the vehicle 12. Alternatively, the actuator 50 can include an electric motor (not separately shown) electrically tied in to the electrical system of the vehicle 12. Control of the electric motor could he by the ECU (not shown), or more preferably is through an electric switch (not shown) accessible to the operator in the cab 18 of the vehicle 12, such as on the dash 30.

Figure 6:
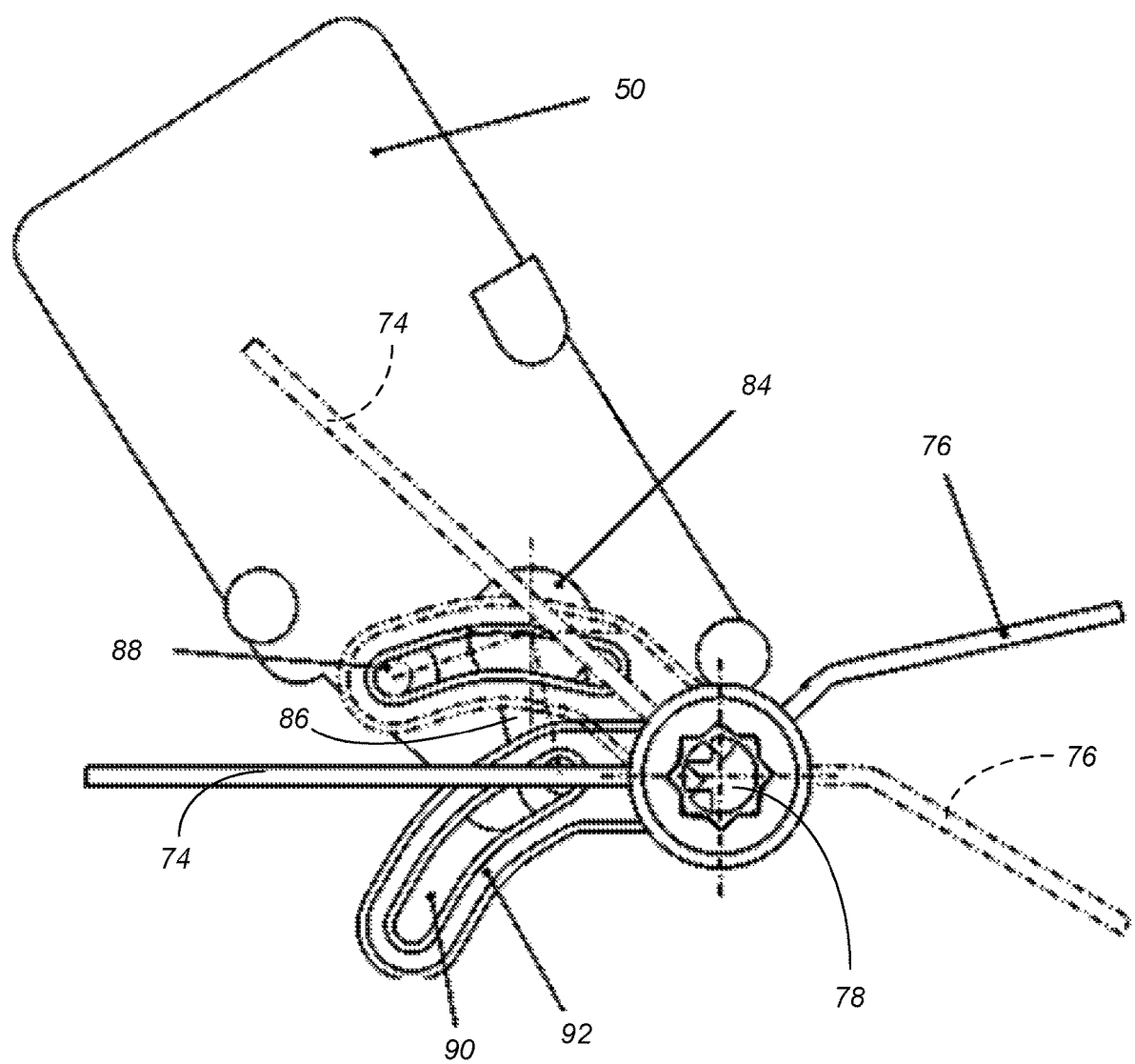
FIG. 6 is a view showing the control plates of FIG. 5, and further schematically showing the actuator and actuator linkage for the control plates.
Figure 6A:
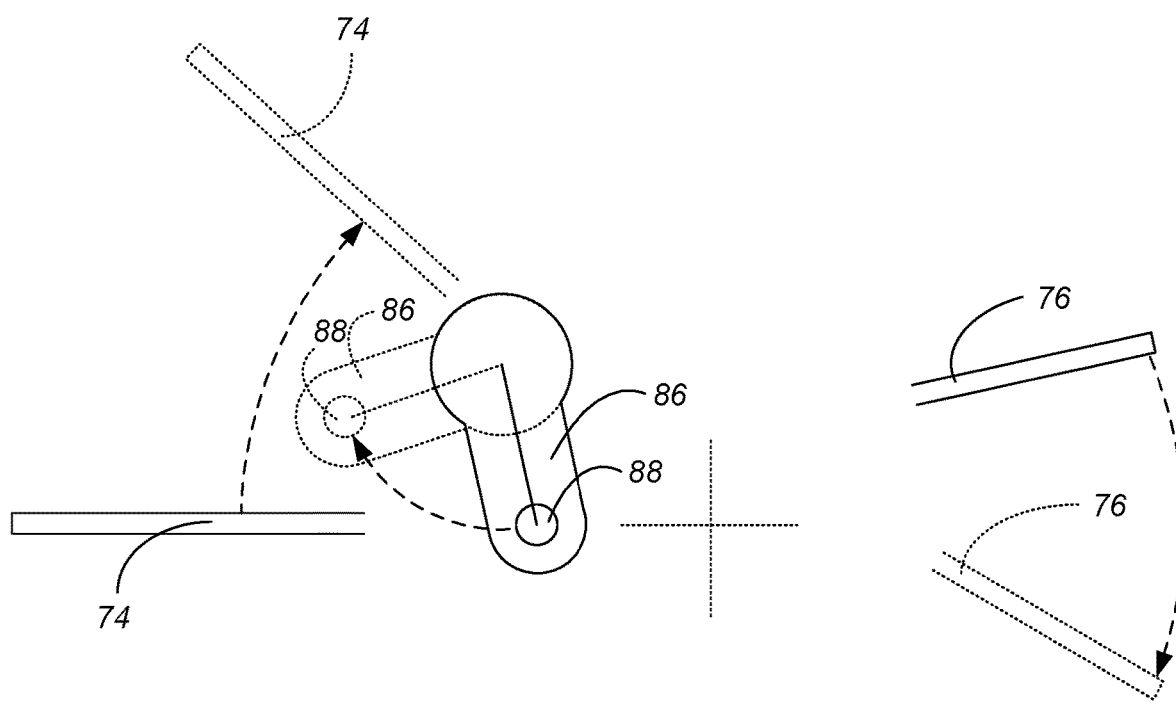
FIG. 6A shows portions of FIG. 6 to better see the relationship between fully opened and fully closed rotational positions.
Figure 7:
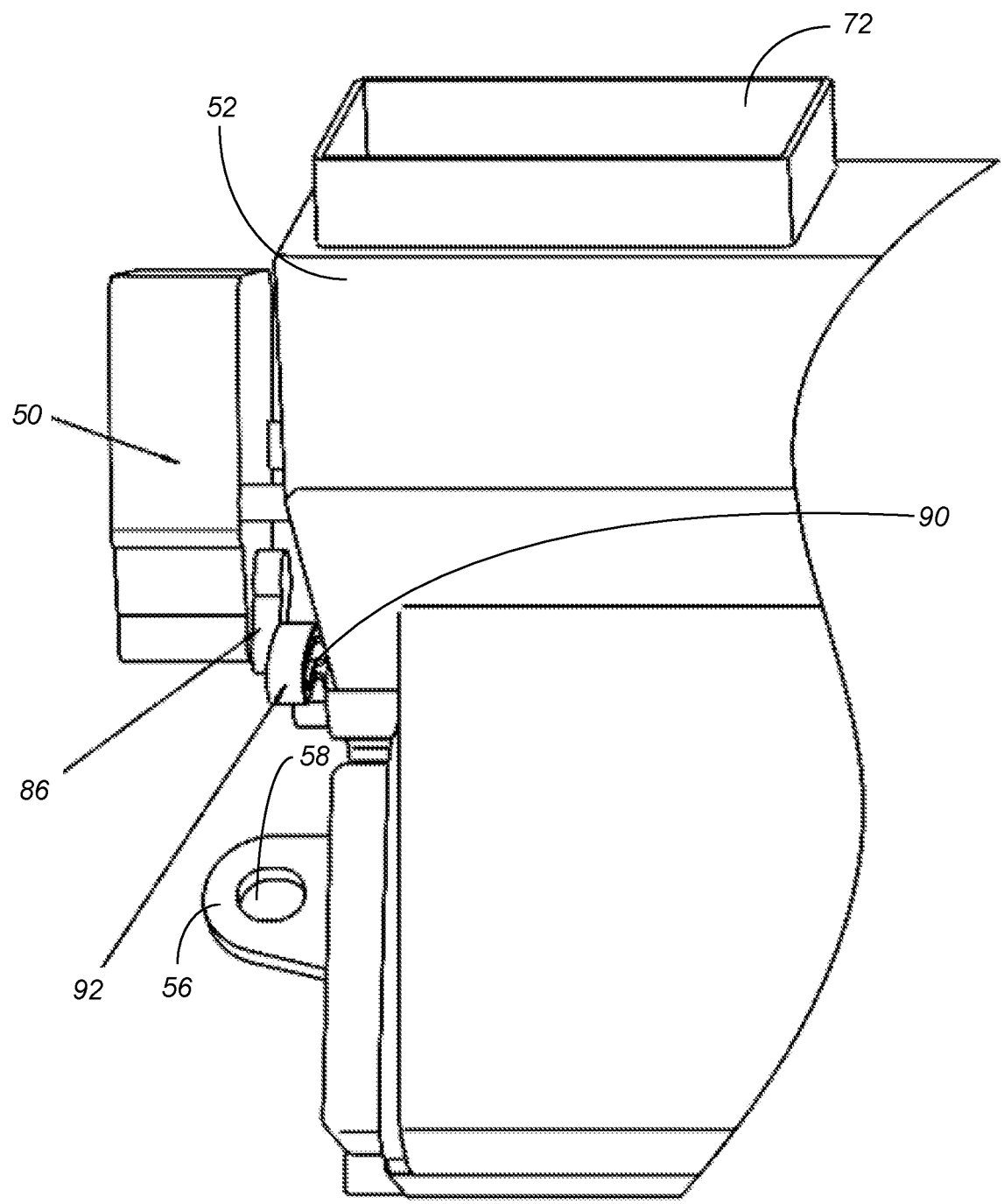
FIG. 7 is a perspective view showing a portion of the heater shell and showing the actuator and actuator linkage of FIG. 6, unmounted relative to the ATV.

If desired, the actuator 50 could have an output shaft directly coupled to plate shaft 78. More preferably as shown in FIGS. 6 and 7, the actuator output shaft 84 drives a swing arm 86 with a guide pin 88 riding in a slot 90 of a drive plate 92 rotationally fixed relative to the plate drive shaft 78. For instance, the end of the shaft 78 can have a star pattern, received in a mating star-shaped opening in the drive plate 92.

The shape and orientation of the slot 90 determines the relationship between the rotation of the drive shaft 84 and the rotation of the plate shaft 78. For example, in the preferred embodiment solid line position, the guide pin movement direction is nearly tangential to the slot direction, resulting in a small movement of the air control plates 74, 76 for a larger movement of the actuator 50. In the embodiment shown, a 10° actuator movement from the solid line position results in about a 3° movement of the air control plates 74, 76. At the opposite end of the throw in the preferred embodiment dashed line position, the guide pin movement direction is much more perpendicular to the slot direction, resulting in a larger movement of the air control plates 74, 76 for a smaller movement of the actuator 50. In the embodiment shown, a 10° actuator movement from the dashed line position results in about a 6° movement of the air control plates 74, 76. Overall, the complete rotational actuator throw is about 84° causing the 42° movement of the air control plates 74, 76 from the solid line position to the dashed line position. Thus it can be seen that the actuator movement is greater than the movement of the air control plates 74, 76, and preferably more than 150% of the movement of the air control plates 74, 76, with the most preferred embodiment having the complete actuator throw movement being about 200% of the plate throw movement. The greater the actuator throw movement relative to the plate throw movement, the more accurate the angular control over the air control plates 74, 76. The preferred embodiment thus results in providing a little more accuracy in the fully opened dashed line position of the air control plate 74 for heating flow 82 through the core 48 as compared to the prior art, and in greatly improving accuracy and gently positioning the air control plates 74, 76 for bypass flow 80 in the solid line position.

In the preferred embodiment, the heater shell 52, 54 has three surfaces that make contact with the air control plates 74, 76 at the end of the throw, a first surface 94 making contact with the air control plate 74 in the fully closed (solid line) position, a second surface 96 making contact with the air control plate 76 in the fully closed (solid line) position, and a third surface 98 making contact with the air control, plate 74 in the fully opened (dashed line) position. Each of these surfaces 94, 96, 98 are preferably parallel to the orientation of the respective air control plate 74, 76, so the air control plates 74, 76 make contact with the shell 52, 54 over a large area at the sealing ends of the throw. If desired, the sides of the air control plates 74, 76 may include cushioning, compressible pads 100 for an even tighter closed (solid line) seal against the housing 52, 54. The cushioning compressible pads 100 are more thermally insulative than the thermally conducting metal of the air control plates 74, 76 and the compressible pads 100 further serve to slow heat exchange from the core 48 to the air flow 80 when the air control plates 74, 76 close off (solid line position) the core 48.

In the preferred embodiment, air flow 82 for heating through the core 48 also requires air flow around the end of the second air control plate 74. Because of this, the flow 82 through the core 48 is much more tortuous than the relatively straight non-heated flow 80 when the core 48 is closed off. For the same fan speed, the non-heated air flow 80 is considerably faster than the heated air flow 82. This is beneficial, because the tortuous path slows the air flow 82 down to allow a longer time for air contact with the core 48 during heating.

Figure 8:
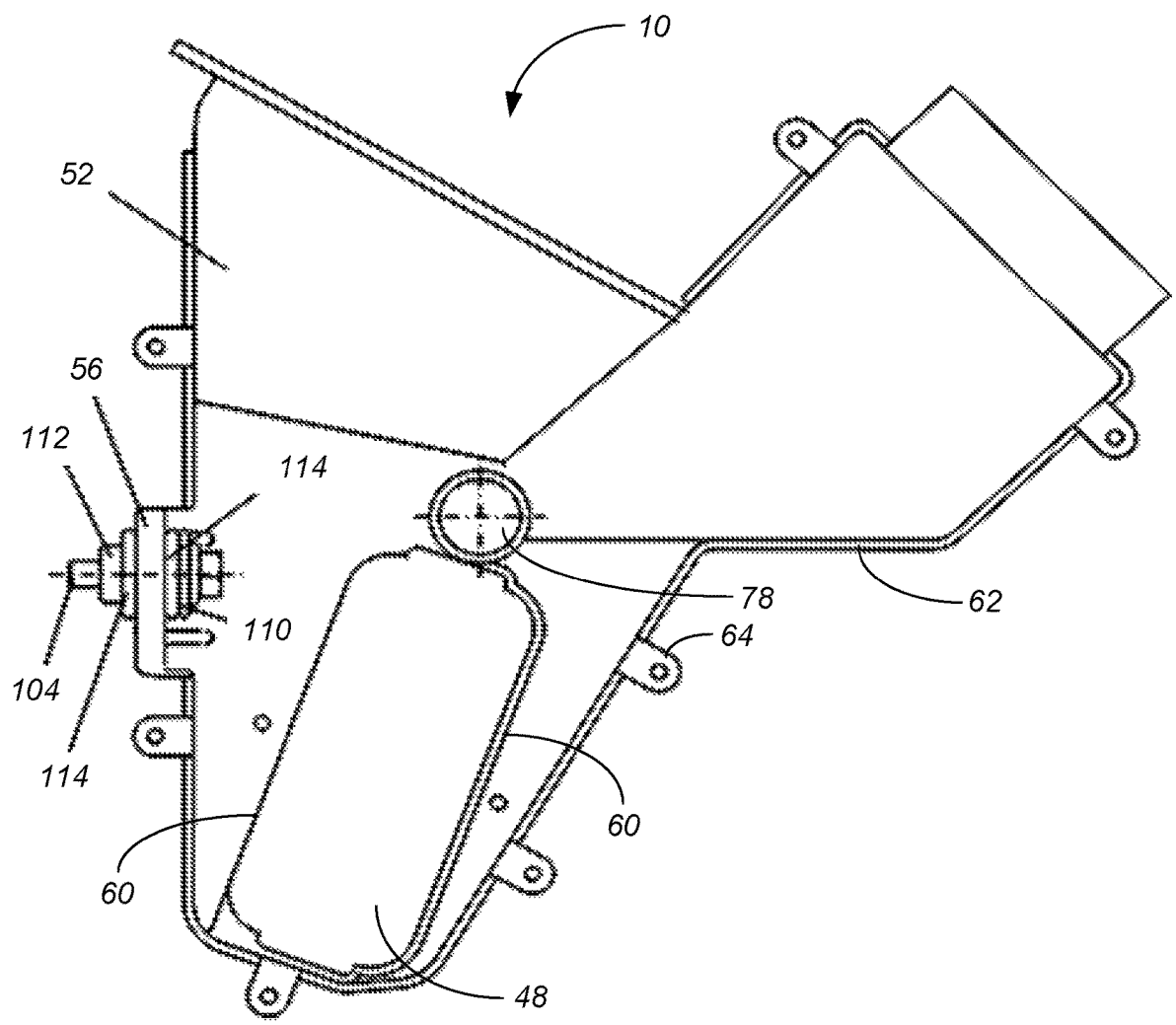
FIG. 8 is an opposite side view of the core housing shell structure of FIG. 4, and further showing the mounting pad for securing the core housing shell structure to the vehicle frame.
Figure 9:
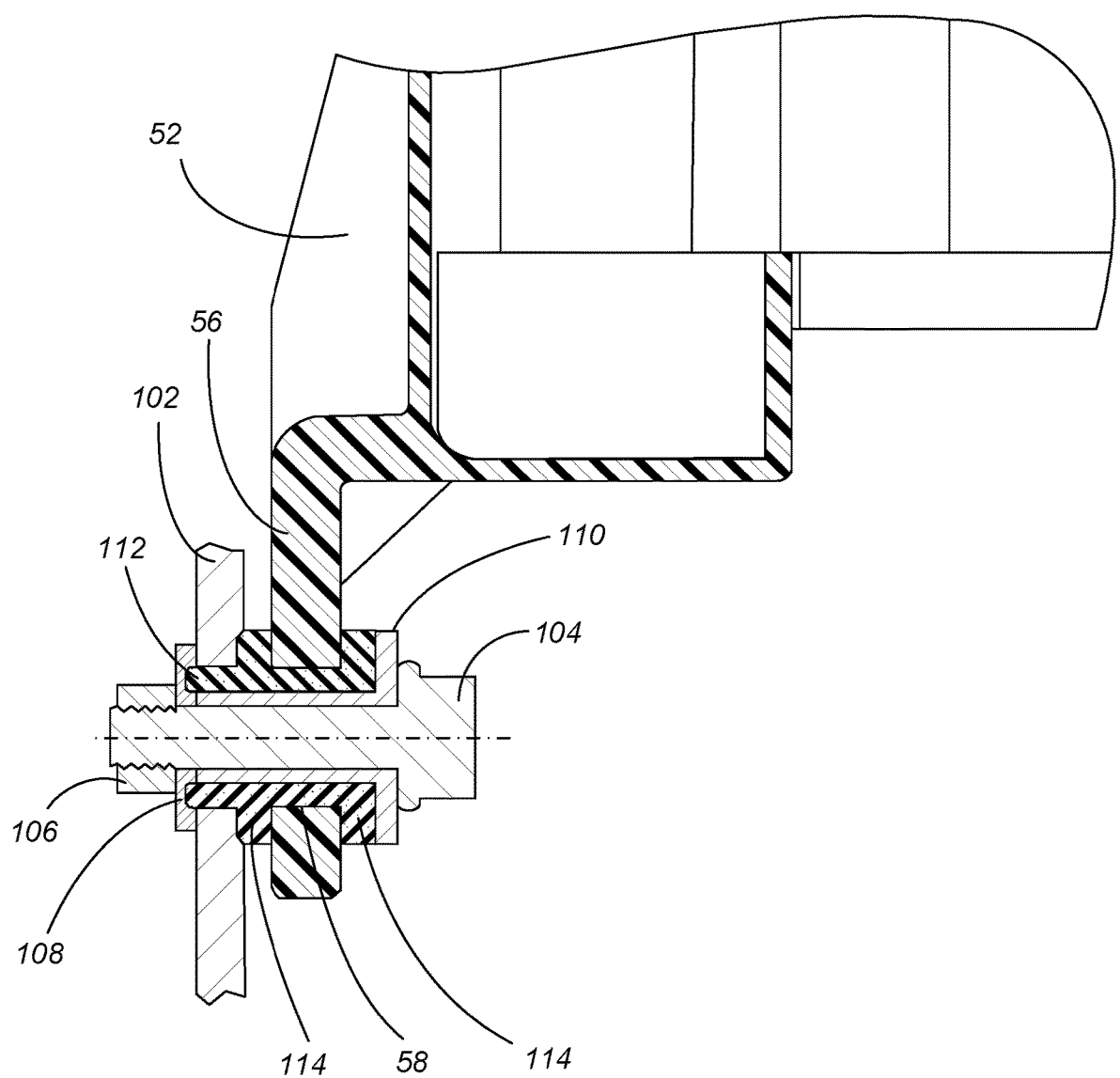
FIG. 9 is an enlargement of a portion of FIG. 8, showing the mounting pad and fastener in cross-section.

FIGS. 8 and 9 detail the mounting structure for securing the two heater shells 52, 54 relative to the frame 102 of the ATV 12 or UV. The heater shell 52, 54 is bolted to the frame 102 at three locations, each with a threaded bolt 104 extending through the ear 56 and secured to the frame 102 using a threaded nut 106, and optionally also including a washer 108. A bushing 110 and resilient cushioning grommet 112 is preferably used which separates the bolt 104 from making contact with either the ear 56 of the shell 52, 54 or the frame 102, in the preferred embodiment, the bolt 104 and nut 106 are formed of metal, the bushing 110 is formed of metal and the cushioning grommet 112 is formed of rubber. The bushing 110 and the resilient cushioning grommet 112 increase the strength of the connection between the heater shell 52, 54 and the frame 102 and reduce the likelihood of breakage as the vehicle 12 vibrates over years of use.

If desired, the bolt 104 could be simultaneously used to connect other structures relative to the frame 102. For instance, instead of the simple washer 108, the bolt 104, could be used to attach part of the fender of the vehicle 12 to the frame 102, with the fender occupying the same location and function as the washer 108 shown. Alternatively, the part of the fender being attached could be between the ear 56 of the shell 52, 54 and the frame 102. If desired, the bolt 104 could be threaded into a threaded, hole on the frame rather than be secured with the threaded nut 106.

In the most preferred embodiment, the cushioning grommet 112 includes two circular separator sections 114 which are larger than the hole 58 through the ear 56 and larger that the hole through the frame 102. In the most preferred embodiment, each separator section 114 is in the range of 2.5-3.5 mm thick, and from 5 to 10 mm greater in outer diameter than the hole 58. During installation, one of the separate sections 114 must be deformed or compressed through the hole 58 prior to insertion of the bushing 110 and bolt 104 through the cushioning grommet 112. By having these separator sections 114 between the ear 56 and the frame 102, and between the ear 56 and the bushing 110, there is less likelihood that the ear 56 will be damaged due to UV or ATV vibration.

The bushing 110 and the washer 108 spread out the compressive force of the bolt 104 and nut 106. The compression of the cushioning grommet 112 helps to avoid vibration slip between the attached structures and improve stability of the connection structure. In the preferred embodiment, tightening of the bolt 104 and nut 106 compresses the both separator sections 114 of the cushioning grommet 112 in the range of 0.4 to 1 mm.

Although the present invention has been described with reference to preferred embodiments, workers skilled in the art will recognize that changes may be made in form and detail without departing from the spirit and scope of the invention

The invention claimed is:

1. An air heat exchanger for an off road vehicle, the air heat exchanger comprising:
   a core for heat exchange with a forced air flow; and,
   a shell structure supporting the core, the shell structure defining an air inlet to the core and an air outlet from the core toward a passenger compartment of the vehicle,
   the air heat exchanger further comprising:
   at least one plate mounted on a shaft within the shell structure, pivoting of the shaft causing the at least one plate to move between a first position wherein the at least one plate directs forced air flow across the core and a second position wherein the at least one plate directs forced air flow to bypass the core; and
   an actuator for rotational pivoting of the shaft from outside the shell structure, the actuator having a rotational throw which is greater than the rotational pivoting of the shaft from the first position to the second position.

2. The air heat exchanger of claim 1, wherein the actuator is linked to the shaft via a swing arm having a drive pin mating with a slot of a drive plate.

3. The air heat exchanger of claim 2, wherein the slot is arcuate.

4. The air heat exchanger of claim 1, wherein when the at least one plate is in the first position, the air flow across the core is around an end of the plate, and wherein when the plate is in the second position the air flow bypassing the core is more direct than the air flow across the core when the at least one plate is in the first position.

5. The air heat exchanger of claim 1, wherein the plate in one of the first and second positions makes generally parallel, planar contact with a surface of the shell structure.

6. The air heat exchanger of claim 5, wherein the air heat exchanger comprises two plates mounted relative to the shaft, wherein one of the plates makes generally parallel, planar contact with a first surface of the shell structure in the first position and makes generally parallel, planar contact with a second surface of the shell structure in the second position, and wherein the other of the plates makes generally parallel, planar contact with a third surface of the shell structure in the second position.

7. The air heat exchanger of claim 5, further comprising a cushioning pad on the plate making contact with the surface of the shell structure.

8. An air heat exchanger for an off road vehicle, the air heat exchanger comprising:
- a core for heat exchange with a forced air flow; and,
- a shell structure supporting the core, the shell structure defining an air inlet to the core and an air outlet from the core toward a passenger compartment of the vehicle,
- wherein the shell structure comprises:
- a left shell supporting a left side of the core, with at least one left shell ear with a left shell bolt hole through the at least one left shell ear;
- a left resilient cushioning grommet lining the left shell bolt hole;
- a left bolt extending through the left shell bolt hole in the at least one left shell ear and through the left resilient cushioning grommet to secure the left shell of the air heat exchanger relative to a frame of the vehicle;
- a right shell separable from the left shell and in an abutting relationship with the left shell and supporting a right side of the core, with at least one right shell ear with a right shell bolt hole through the at least one right shell ear;
- a right resilient cushioning grommet lining the right shell bolt hole; and
- a right bolt extending through the right shell bolt hole in the at least one right shell ear and through the right resilient cushioning grommet to secure the right shell of the air heat exchanger relative to the frame of the vehicle.

9. The air heat exchanger of claim 8, wherein abutting ends of the left shell and the right shell comprise a circumferential groove in one of the left and right shells, such that the other of the left and right shells extends into the circumferential groove of the one of the left and right shells.

10. The air heat exchanger of claim 9, wherein each of the left and right shells comprise plates for supporting the core.

11. The air heat exchanger of claim 10, further comprising at least one plate mounted on a shaft extending from the left shell to the right shell within the shell structure, pivoting of the shaft causing the plate to move between a first position wherein the plate directs forced air flow across the core and a second position wherein the plate directs forced air flow to bypass the core.

12. The air heat exchanger of claim 11, further comprising an actuator for rotational pivoting of the shaft from outside the shell structure, the actuator having a rotational throw which is greater than the rotational pivoting of the shaft from the first position to the second position.

* * * * *